(12) United States Patent
McDonnough et al.

(10) Patent No.: US 8,899,416 B2
(45) Date of Patent: Dec. 2, 2014

(54) SOFT PLASTIC INSERT FOR USE IN PROTECTIVE CASE

(75) Inventors: Andrew James McDonnough, Camanche, IA (US); Duane David Franzen, Jr., Cordova, IL (US); Michael Grinnall, Clinton, IA (US)

(73) Assignee: Custom-Pak, Inc., Clinton, IA (US)

( * ) Notice: Subject to any disclaimer, the term of this patent is extended or adjusted under 35 U.S.C. 154(b) by 1518 days.

(21) Appl. No.: 12/057,986

(22) Filed: Mar. 28, 2008

(65) Prior Publication Data

US 2008/0237939 A1     Oct. 2, 2008

Related U.S. Application Data

(60) Provisional application No. 60/908,508, filed on Mar. 28, 2007.

(51) Int. Cl.
| | | |
|---|---|---|
| *B65D 85/16* | (2006.01) | |
| *A45C 13/02* | (2006.01) | |
| *F41C 33/06* | (2006.01) | |
| *B29L 31/00* | (2006.01) | |
| *B29C 49/04* | (2006.01) | |
| *B29K 23/00* | (2006.01) | |
| *B29C 51/10* | (2006.01) | |
| *B29C 49/06* | (2006.01) | |

(52) U.S. Cl.
CPC ........... *A45C 13/02* (2013.01); *B29C 2791/007* (2013.01); *B29L 2031/7418* (2013.01); *B29C 2791/006* (2013.01); *B29K 2023/06* (2013.01); *B29C 49/04* (2013.01); *B29K 2023/12* (2013.01); *B29C 51/10* (2013.01); *F41C 33/06* (2013.01); *B29C 49/06* (2013.01)
USPC ................................ 206/373; 70/63; 425/535

(58) Field of Classification Search
USPC ......... 425/296, 535; 206/228, 232, 558; 70/63
See application file for complete search history.

(56) References Cited

U.S. PATENT DOCUMENTS

| | | | | |
|---|---|---|---|---|
| 3,327,841 | A | * | 6/1967 | Confer et al. ................. 206/349 |
| 4,662,515 | A | * | 5/1987 | Newby, Sr. .................... 206/349 |
| 5,009,088 | A | * | 4/1991 | Cislo ................................. 70/63 |
| 6,023,915 | A | * | 2/2000 | Colombo ........................ 53/432 |
| 2005/0084648 | A1 | * | 4/2005 | Olsen et al. ................... 428/100 |
| 2006/0073289 | A1 | * | 4/2006 | Bahnsen et al. ............. 428/34.1 |
| 2007/0012704 | A1 | | 1/2007 | Grinnall et al. |

OTHER PUBLICATIONS

International Search Report and Written Opinion of the International Searching Authority, Jun. 11, 2008 (7).

* cited by examiner

*Primary Examiner* — Anthony Stashick
*Assistant Examiner* — Raven Collins
(74) *Attorney, Agent, or Firm* — St. Onge Steward Johnston & Reens LLC (57) ABSTRACT

An insert for protecting articles to be stored in a protective case. The insert is generally hollow and formed of a flexible thermoplastic material. The insert may be formed by a blow-molding process. The insert is shaped to fit within a protective case, which is also often formed by a blow-molded process. The material used to form the insert is less dense than that of the material used to form the protective case, and therefore the insert material is less stiff, softer, and more flexible.

20 Claims, 8 Drawing Sheets

SOFT PLASTIC INSERT FOR USE IN PROTECTIVE CASE

CROSS-REFERENCE TO RELATED APPLICATIONS

The present invention claims the benefit under 35 U.S.C. 119(e) of U.S. Provisional Patent Application Ser. No. 60/908,508, filed on Mar. 28, 2007, entitled Plastic Case With Soft Plastic Insert, the entirety of which is incorporated by reference herein.

FIELD OF THE INVENTION

The present invention relates to plastic cases. More specifically, the invention relates to an insert for storing articles to be received in a protective case.

BACKGROUND OF THE INVENTION

The use of blow-molding as a method for manufacturing various sorts of articles is generally well known. Typically, this process involves the use of a mold consisting of two separate halves or portions having cavities of particularly desired shapes and sizes. Usually, one extrudes a large-diameter, sealed tube of molten material (commonly referred to as a "parison"), places the parison between the mold halves, and closes the mold around the parison. The parison is often made of a thermoplastic material. Fluid pressure is then introduced into the parison via an opening, forcing the molten parison against the walls of the cavities, conforming the parison to the shape thereof. The pressure is maintained until the molten material cools and solidifies. The pressure is then released, the mold halves are pulled apart, and the hardened article is ejected therefrom.

The process of blow-molding is commonly employed to manufacture double wall cases. By producing cases in this manner, one is able to produce a device that is capable of carrying and protecting tools or other articles that has a multitude of desirable physical characteristics—such as rigidity, scuff resistance, and impact absorption—yet that is relatively inexpensive to manufacture. Many such cases are capable of being sealingly closed so as to protect the contents of the case from the environment external to the case, including such elements as moisture and dirt.

In some instances, such cases are formed as single-piece cases using the process described above, where one mold half forms the exterior of both the base and lid portions of the case, while the other mold half forms the interior of both the base and lid portions. Usually, the mold half forming the exterior of the case forms a wall with a smooth, attractive shape, while the mold half that forms the interior of the case is often molded with compartments to hold specific contents. In other instances, the process described above can be used to separately create the base and lid portions of the case, which can subsequently be connected together.

Though such cases are generally well known in the art, efforts have been made to increase the carrying capacity of such cases while reducing the size of the case, as attempts to increase the interior space of the case can quickly increase the weight and size of the case due to its double wall nature. Accordingly, it has been suggested to cut out sections of the interior walls of the case in order to utilize the wasted volume of space between the double walls. In some instances, the majority of the interior wall is cut out in order to maximize the interior volume of the case. By taking such measures, the case can be made smaller in light of the fact that this previously unused space is now being used to house the objects being carried in the case. Moreover, by removing sections of the walls, the case also decreases significantly in weight.

For example, U.S. Pat. Nos. 3,317,955 and 3,327,841 to Schurman, et al., disclose cases in which a portion of the case wall is cut out after blow-molding. Specifically, the '955 patent, which discloses the earliest known double wall blow-molded case, illustrates a rectangular cutout of most of the inside wall of the base portion. Similarly, the '841 patent discloses a partial cutout shaped to accommodate the outline of a pistol-type soldering gun, where the gun is further supported by a cradle molded in the outside wall of the base portion of the case, while the space under the uncut portion of the inside base is usable for storage of an electric cord, thereby facilitating the use of what was previously wasted, unused space. In these particular examples, because the blow molding process involves the use of a parison with a continuous, unbroken surface (and thus, the mold itself cannot produce any holes in the blow-molded wall other than the hole or holes through which the fluid pressure is introduced), a section of the case wall is cut or burned after the blow molding process is completed and the case has been ejected from the mold. For example, cutting the inner wall was often accomplished with the use of a small circular saw blade mounted to a router and guided by a molded vertical lip surrounding the area to be cut. The router was fixed and the case was moved around the router axis by hand or by mechanical means. Round holes were often cut with hole saws, or occasionally, were burned.

Another, more improved method of removing a section of the inner wall of the case is to punch a hole in this wall during the blow molding process. Examples of such a method are disclosed in U.S. patent application Ser. Nos. 10/958,824 and 11/105,721, each of which is assigned to the assignee of the present application and the disclosures of these applications are incorporated herein by reference. In these varieties, punches are used during the blow-molding process to produce the desired holes. The punch, when in an unactivated position, forms a portion of mold surface, against which the walls of the blow molded case are blown. Then, at a predetermined interval, before the walls of the case are fully hardened, the punch is moved to an activated position, creating a hole in the wall of the case.

Once portions of the interior walls of the case have been removed, it is customary for the case maker to provide means to store, organize, and protect articles to be placed in the case. For example, in many instances, a foam insert will be placed in the case. The foam insert often has cut out portions which are shaped to correspond to the shape of articles intended to be placed therein. The foam serves to protect the articles by preventing them from repeatedly colliding with the walls of the case or against other articles present in the case. The foam also allows for better organization of articles in the case, since each article can be secured in a separate cut out. Foam inserts are often chosen to store valuable articles which are desired to be preserved in a pristine condition, such as firearms, figurines, glassware, or optical equipment.

An example of the use of a foam insert is shown in U.S. Pat. No. 5,009,088 to Cislo. The Cislo patent discloses the use of a piece of foam rubber that has a recess shaped to correspond to the outline of a handgun. The piece of foam rubber is placed in a case that would be made of a strong and stiff material. For storage and protection of the handgun, the handgun is placed in the foam rubber inside the case and the case is closed.

Unfortunately, there are significant drawbacks to using foam inserts inside such cases for storing, protecting, and preserving articles. A primary drawback is that foam inserts have a tendency to retain moisture. Because many protective cases are nearly sealed or completely sealed when closed, moisture that is present inside the case will be unable to escape. Further, due to the nature and intended use of the cases, they are rarely, if ever, open for a period of time that would be adequate to allow the moisture to evaporate. Thus, if a foam insert becomes wet, it will often retain the moisture indefinitely if the owner of the case is unaware of its presence.

As one of skill in the art will readily appreciate, the presence of moisture can have deleterious effects on the articles stored and intended to be preserved in the cases, particularly if such articles are made of metal. For example, articles such as firearms must be stored in a nearly moisture-free environment if they are to be pristinely preserved. It is therefore important for the owner of such an article and case to be able to ensure that there is no retained moisture in the case. Ensuring that a foam insert is entirely moisture free is time consuming.

What is needed then, is an insert for storing and protecting articles that will not retain moisture and that can be easily cleaned and dried. The insert should also be lightweight and not bulky or burdensome to carry or transport. The insert should provide adequate cushioning of the articles that are intended to be stored so as to prevent damaging of the articles. The insert should be simple and inexpensive to manufacture in large quantities.

SUMMARY OF THE INVENTION

It is an object of the present invention to provide an insert to store and protect articles placed therein.

It is yet another object of the present invention to provide an insert to store and protect articles that will not retain moisture.

It is yet another object of the present invention to provide an insert to store and protect articles that is easily cleaned and dried.

It is still another object of the present invention to provide an insert to store and protect articles that is lightweight and not cumbersome to carry or transport.

It is still a further object of the present invention to provide an insert that provides adequate cushioning of articles that are intended to be stored so as to prevent damaging of the articles.

It is yet a further object of the present invention to provide an insert to store and protect articles that is simple and inexpensive to manufacture in large quantities.

These and other objects are accomplished by the present invention which provides, according to one embodiment, a case for housing at least one object, comprising a base portion, a lid portion, and a hollow insert. The base portion comprises a first cavity. The lid portion is connected by a hinge to the base portion and comprises a second cavity. The hollow insert comprises external walls, is shaped to be receivable in one of the first cavity or the second cavity and at least one external wall has at least one recess shaped to receive the at least one object. The external walls of the hollow insert have a lower stiffness than the base portion and the lid portion.

In some embodiments, the base portion and the lid portion are formed by blow-molding. In some embodiments, the hollow insert is formed by blow molding. In some embodiments, the hollow insert is a first hollow insert and the case further comprises a second hollow insert that is receivable in the other of the first cavity or the second cavity. In some embodiments, the second hollow insert is shaped to press against the object when the object is received in the recess of the first hollow insert. In some embodiments, the base portion, the lid portion, and the hollow insert comprise thermoplastic materials. In some embodiments, the recess is shaped to correspond to the outline of the at least one object so that the recess secures the at least one object by friction. In some embodiments, the interior of the hollow insert formed by the external walls is sealed to the environment external to the hollow insert. In some embodiments, the pressure inside the hollow insert is greater than 1 atmosphere. In some embodiments, the interior of the hollow insert formed by the external walls is in fluid communication with the environment external to the hollow insert.

According to a second embodiment of the present invention, an insert receivable within a protective case for holding at least one object is provided, comprising a bottom wall, a plurality of side walls, and a top wall. The top wall having at least one recess shaped to correspond to the outline of the at least one object for receiving the at least one object. The bottom wall, side walls, and top wall form a hollow interior of the insert. The bottom wall, side walls, and top wall are less stiff than the case within which the insert is received so as to provide cushioning to the object.

In some embodiments, the interior of the insert is sealed to the environment exterior to the insert. In some embodiments, the pressure in the interior of the insert is greater than 1 atmosphere. In some embodiments, the insert further comprises an opening such that the interior of the insert is in fluid communication with the environment exterior to the insert. In some embodiments, the insert comprises a thermoplastic material.

According to a third embodiment of the present invention, a method for producing a case comprising an external shell and an insert for storing at least one object is provided, comprising the steps of: molding a base portion and a lid portion of the external shell; forming a cavity in one of the base portion or the lid portion of the external shell; molding a hollow insert shaped to be receivable in the cavity; and placing the hollow insert in the cavity in the base portion of the external shell. Where the hollow insert comprises a bottom wall, a plurality of side walls, and a top wall which together form a hollow interior of the insert, such that the bottom wall, side walls, and top wall have a lower stiffness than the external shell.

In some embodiments, the step of molding a base portion and a lid portion of an external shell comprises blow-molding the base portion and the lid portion of the external shell using a single mold. In some embodiments, the step of forming a cavity in one of the base portion or the lid portion of the external shell comprises removing a section of a surface of one of the base portion or the lid portion. In some embodiments, the step of molding a hollow insert comprises blow-molding. In some embodiments, the step of molding a base portion and a lid portion of an external shell comprises: blow-molding the base portion using a first mold; blow-molding the lid portion using a second mold; and joining the base portion and the lid portion by a hinge.

The present invention thus provides a hollow insert for use within a protective case, where the material used to form the insert is less dense, and therefore less stiff, softer, and more flexible than the material used to form the protective case. The materials, which are often thermoplastic materials, are easily cleaned and dried. The inserts and protective cases are often made using a blow-molding process and are therefore simple and inexpensive to manufacture in large quantities. The insert can be used in place of the prior art foam inserts and serves to protect the stored articles by preventing them from repeatedly colliding with the walls of the protective case or against other articles present in the case.

DETAILED DESCRIPTION OF THE FIGURES

Figure 1:
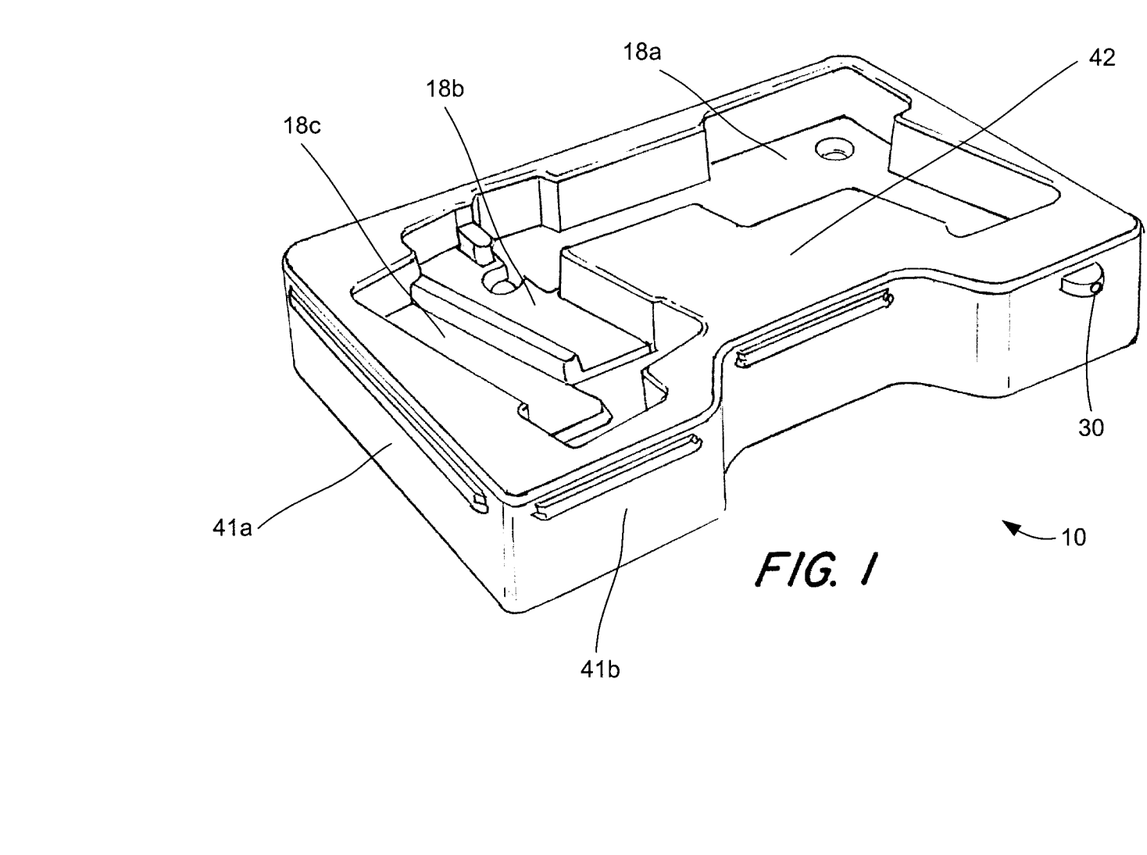
FIG. 1 is an isometric view of an insert according to the present invention.
Figure 2:
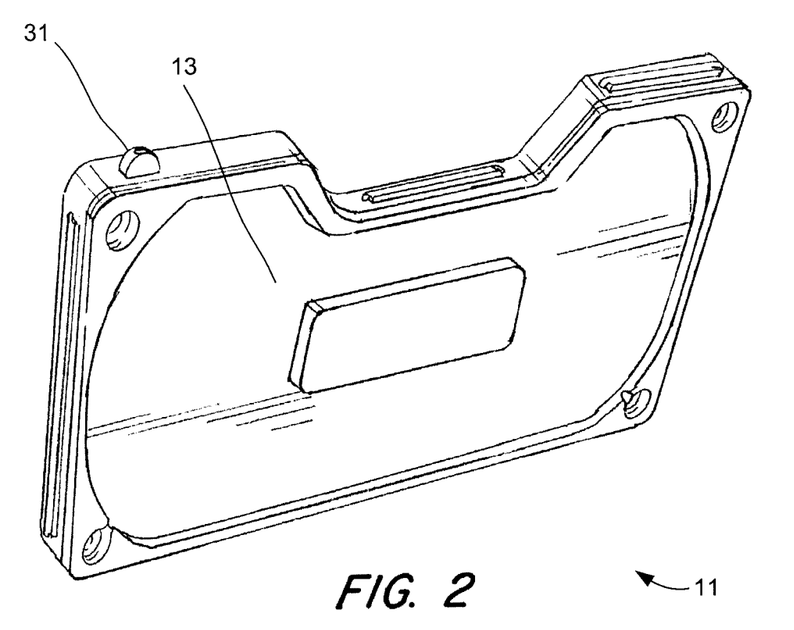
FIG. 2 is an isometric view of a second insert according to the present invention.

An exemplary embodiment of the present invention will now be described with reference to the Figures. FIG. 1 shows an insert 10 according to one exemplary embodiment of the present invention. The insert 10 is intended to fit within a protective case (as described below) and has recesses 18a, 18b, and 18c for receiving objects. Insert 10 may be considered a "base" insert in that it is intended to be placed in the "base" portion of a protective case. FIG. 2 shows a second insert 11 that may be considered a "lid" insert because it is intended to be placed in the "lid" portion of a protective case. This relationship will be described in more detail below.

Base insert 10 and lid insert 11 are generally hollow structures and are generally formed of a thermoplastic material such as polyethylene, polypropylene, engineering grade resin or the like. The base insert 10 and the lid insert 11 shown in the Figures were formed by a blow-molding process, such as extrusion blow-molding, injection blow-molding, or stretch blow-molding. One of skill in the art will recognize, however, that other, similar molding or formation processes may be employed to make the inserts according to the present invention, such as injection molding, rotational molding, or various types of thermoforming like vacuum forming or pressure forming, so long as the desired structural and performance characteristics of the inserts are achieved.

The base insert 10 has external walls including four side walls, including 41a and 41b (only these side walls are visible in FIG. 1), top wall 42, and a bottom wall (not visible in FIG. 1) and is hollow within these external walls. The base insert 10 has shaped recesses 18a, 18b, and 18c formed in the top wall 42 to receive and securely hold articles to be stored. In the exemplary embodiment shown in the Figures, the recesses 18a, 18b, and 18c are shaped to correspond to the outline of the article intended to be stored by the insert. The recesses 18a, 18b, and 18c of base insert 10 are shaped to hold a pistol at 18a and two ammunition magazines at 18b and 18c. However, many types of articles can be stored in inserts according to the present invention by carefully shaping the recesses 18a, 18b, and 18c. The recesses 18a, 18b, and 18c or any additional recesses can be dimensioned so that the article to be stored is securely held in the recess by the friction between the outline of the article and the side surfaces of the recess. This arrangement can help to prevent unwanted movements by the article within the case. The recesses can even be dimensioned so as to prevent the article from falling from the recess when the insert is completely inverted. In other embodiments, the insert is provided with other mechanisms known to those of skill in the art for retaining articles in the recesses. Examples include straps or small plates or rods that are attached to the insert by hinges or other mechanisms that allow pivoting. Press-fit snaps, hook-and-loop, or similar means are used to secure the retaining mechanisms.

In the embodiment shown in FIG. 2, lid insert 11 does not have recesses such as the recesses 18a, 18b, and 18c formed in base insert 10. Instead, lid insert 11 has a smooth, outward facing surface 13. This outward facing surface 13 faces, or is even pressed against, the portion of the base insert 10 where the recesses 18a, 18b, and 18c are formed and, thus, where the articles are stored. Therefore, in some embodiments, the lid insert 11 may be used to apply a selected degree of pressure to the stored articles to help prevent the articles from moving. The surface 13 can also be shaped to include projections or contours that correspond to the shape of the articles to be stored in the base insert 10 to provide additional storing security.

The material, which is most often a thermoplastic material, used for creating the inserts 10 and 11 is selected such that the inserts will provide adequate protection to the articles to be held by the inserts and stored in the case. The material must be sufficiently flexible, soft, and elastic to provide cushioning and shock absorption protection to the stored articles against movements and vibrations. The hollow nature of the inserts, the material out of which they are formed, and/or the process by which they are formed create the desired characteristics to provide this protection. In the embodiment shown in the figures, both the base insert 10 and the lid insert 11 are formed of the same material and work together to protect the stored articles. In other embodiments, two inserts to be used in a case are made of different materials. The material selected for creating both base insert 10 and lid insert 11, while not necessarily the same material, will generally have similar properties. For example, the material will be easy to clean and dry and will be unlikely to retain moisture that will not be easily detectable by a person using the inserts.

Both the base insert 10 and the lid insert 11 include breather holes 30 and 31, respectively, as shown in FIGS. 1 and 2. In the embodiment shown, the breather holes 30 and 31 are the parison openings that were used during the process of manufacturing the inserts 10 and 11. In FIG. 1, the breather hole 30 is open and allows the air pressure within the base insert 10 to remain roughly equal to that of the surrounding atmosphere. On the other hand, the breather hole 31 on the lid insert 11 is closed, making the interior of lid insert 11 sealed from the external environment. In this embodiment, the interior of lid insert 11 is pressurized so that its internal pressure is higher than that of the surrounding, external environment. This arrangement provides additional cushioning to any stored articles. The amount of pressure supplied in the inserts can be varied according to the amount of shock absorption desired for the insert. In other embodiments, both the base insert 10 and the lid insert 11 are sealed and pressurized. Whether to seal the insert and the amount of internal pressure supplied to the insert will depend on the articles intended to be stored.

FIGS. 3, 3A, 3B, 4, 5, and 6 show various views of the protective case 20 for receiving the inserts 10 and 11. In the embodiment shown, the case 20 is formed of a thermoplastic material such as polyethylene, polypropylene, engineering grade resin or the like. In the embodiment shown, the case 20 was formed by a blow-molding process, such as extrusion blow-molding, injection blow-molding, or stretch blow-molding. One of skill in the art will recognize, however, that other molding or formation processes may be employed to make the case 20, such as injection molding, rotational molding, or various types of thermoforming like vacuum forming or pressure forming.

Figure 3:
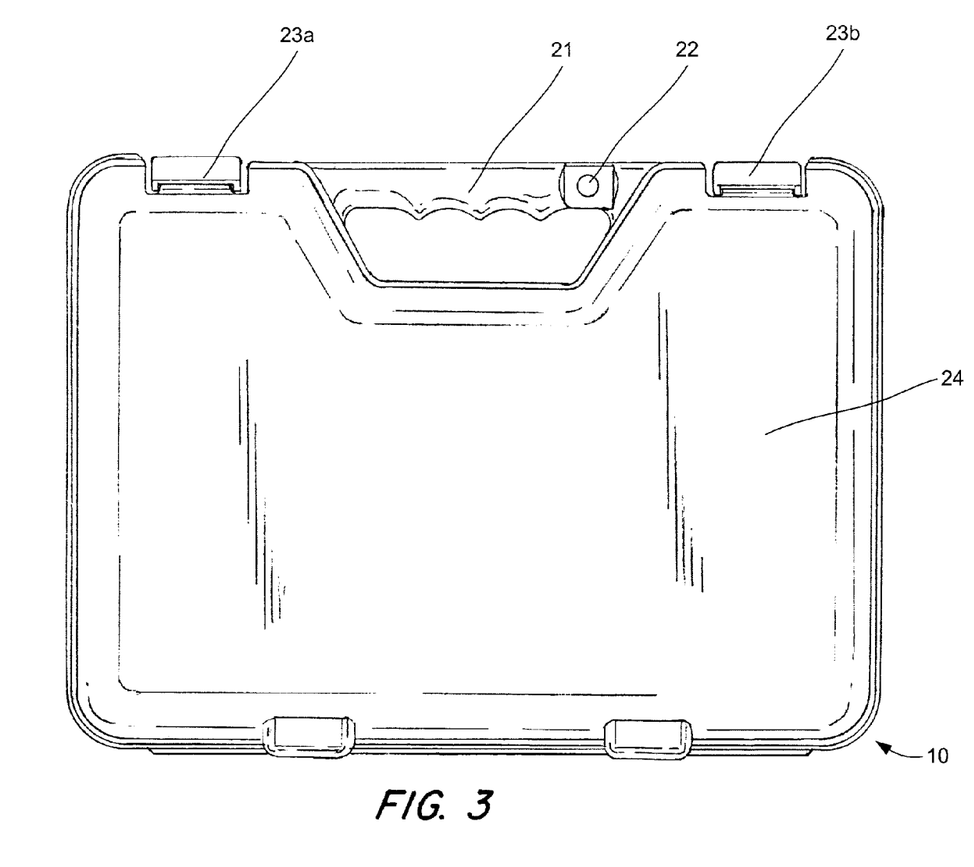
FIG. 3 is a front view of a plastic case for receiving the insert of FIG. 1, shown in a closed position.

The case 20 and the inserts 10 and 11 are formed of generally similar materials and by similar processes, but there are important differences between their final structures. As described above, the inserts 10 and 11 are adequately soft and flexible to protect the stored articles against vibration and shock. The walls of the case 20, on the other hand, are harder and more rigid. Often, the material chosen for making case 20 is denser than that of the inserts 10 and 11 and has greater stiffness. In other embodiments, the thickness of the walls and/or the process of manufacture provides the necessary hardness, rigidity, and resiliency for the case 20. Thus, the case 20 will provide protection against perils such as thrown objects, sharp objects, dropping, and the like. The softer, less stiff material of the inserts 10 and 11 will be far less likely to damage the articles placed in the case than the more rigid material of the case 20.

Figure 3A:
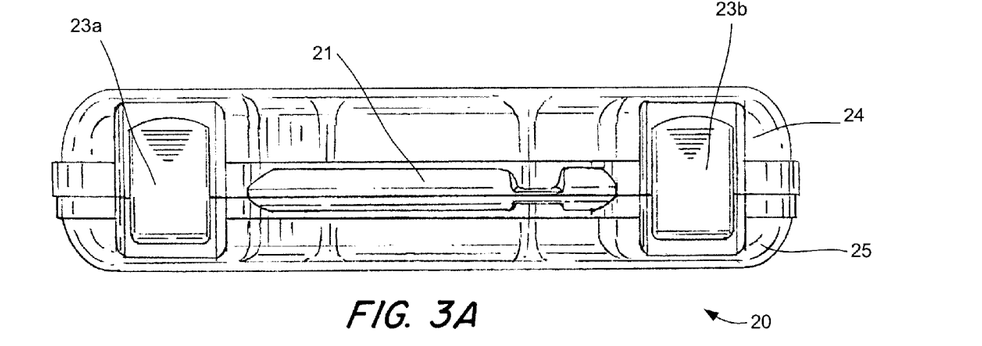
FIG. 3A is a top view of the plastic case of FIG. 3 in a closed position.
Figure 3B:
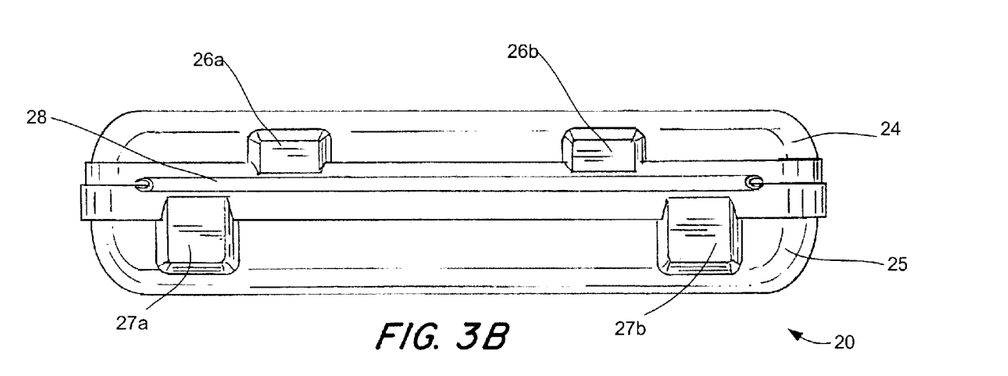
FIG. 3B is a bottom view of the plastic case of FIG. 3 in a closed position.
Figure 4:
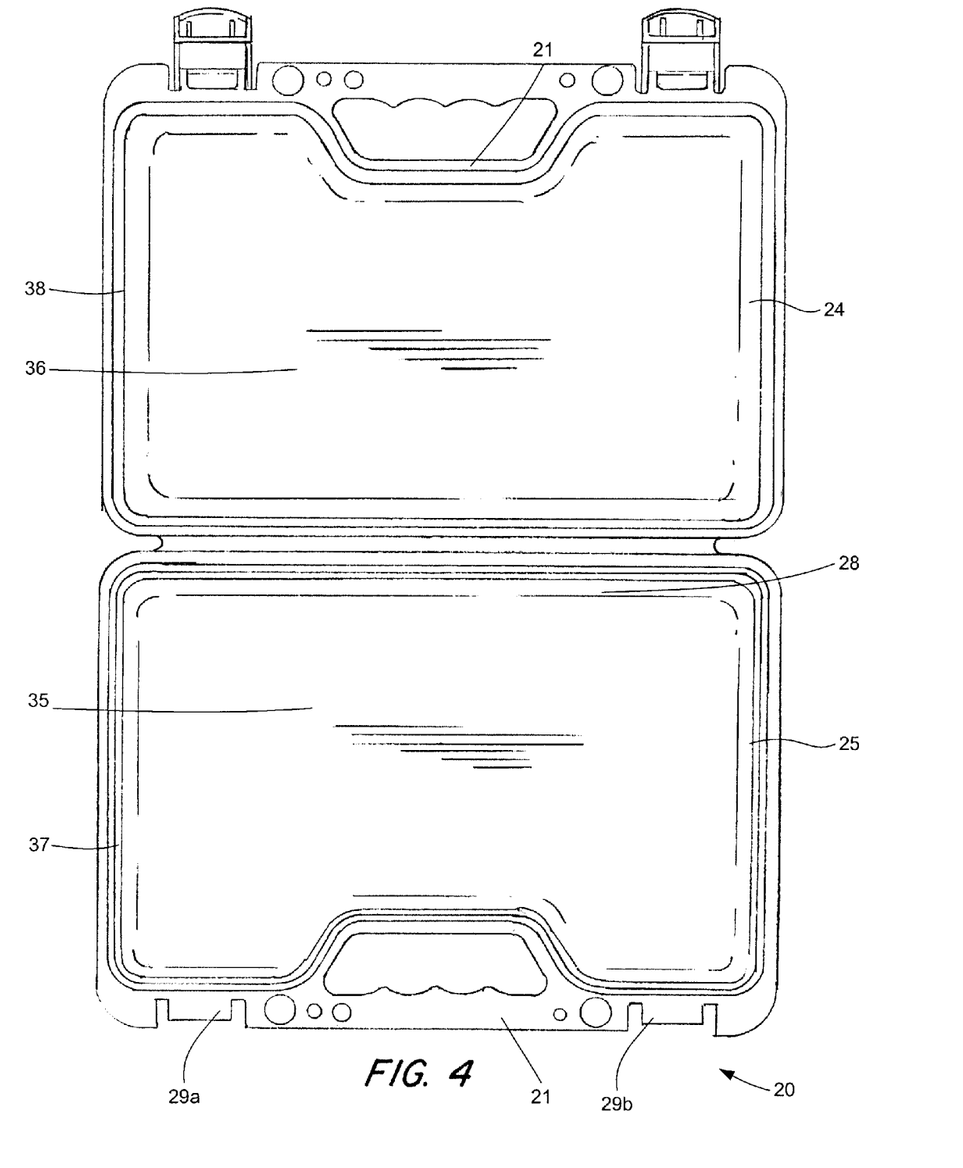
FIG. 4 is a front view of the plastic case of FIG. 3 in an open position, showing internal cavities for receiving the insert of FIG. 1 and the insert of FIG. 2.
Figure 5:
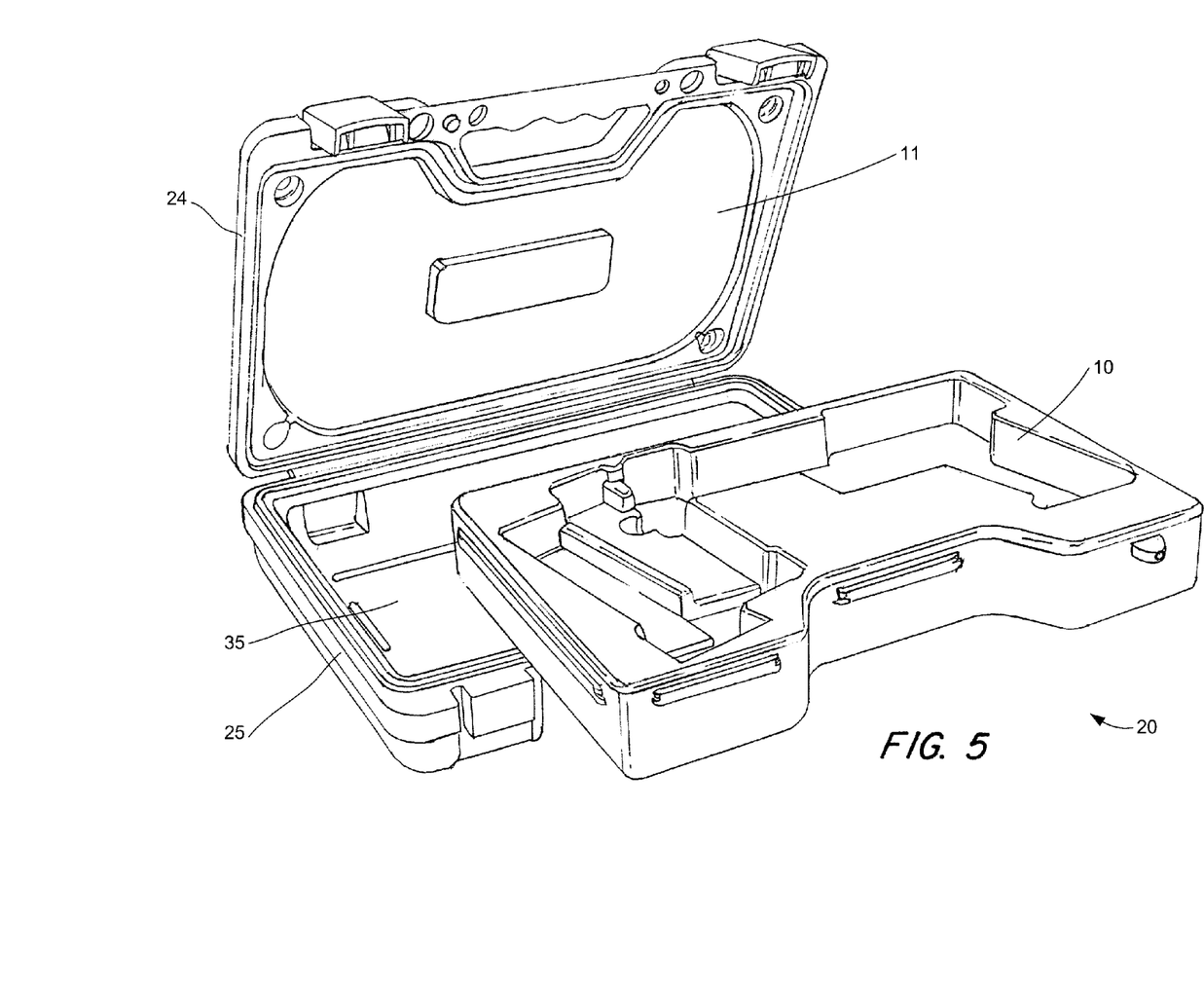
FIG. 5 is a front view of the plastic case of FIG. 1 in an open position with one insert partially removed.
Figure 6:
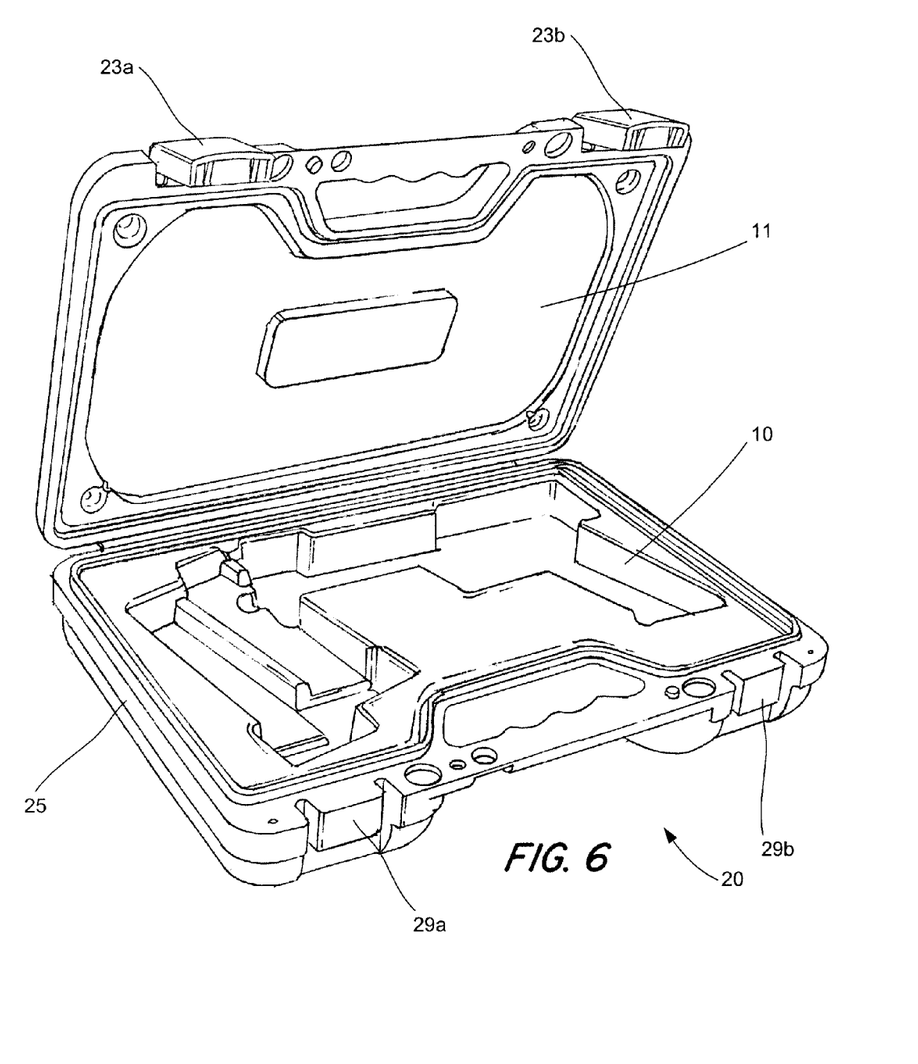
FIG. 6 is an isometric view of the interior of the plastic case of FIG. 3 in an open position showing the inserts of FIGS. 1 and 2 received in internal cavities of the case.

FIGS. 3, 3A, and 3B show the case 20 in a closed position, while FIGS. 4, 5, and 6 show the case 20 in an open position. FIG. 3 shows the front side of the case 20, and the lid portion 24. FIG. 3 shows that the case 20 has a handle 21, which is shaped for comfortable gripping by a person's hand. The handle 21 has a hole 22 for receiving a lock of some kind so that the case can be locked in a closed position. As shown clearly in FIGS. 4, 5, and 6, the handle 21 is formed in two halves, one on the lid portion 24 and one on the base portion 25. In other embodiments, of course, the handle is formed on only one of the base or lid portions. The external surfaces of the case 20 may include a design or logo for purposes of identifying the case or the articles stored inside.

The case 20 has latches 23a and 23b, shown in FIGS. 3 and 3A, for securing the case 20 in the closed position. The latches 23a and 23b are attached to the lid portion 24 by hinges and are designed to engage with projections 29a and 29b (shown in FIGS. 4 and 6) on the base portion 25 of the case 20. The latches 23a and 23b may be formed of any suitable material, such as thermoplastic, metal, or the like.

FIG. 3A shows a top view of the case 20 and the latches 23a and 23b are clearly visible in their closed position. Both the base portion 25 and the lid portion 24 are visible in FIG. 3A. FIG. 3B shows a bottom view of the case 20. Both the lid portion 24 and the base portion 25 have protrusions to allow the case to be stood on end on a flat surface. Lid portion 24 has protrusions 26a and 26b which work in conjunction with protrusions 27a and 27b on the base portion 25 to allow the case 20 to stand on end when it is in a closed position.

FIG. 3B also shows a hinge 28 that connects the lid portion 24 and the base portion 25. The hinge 28 shown in FIG. 3B is simply a flexible piece of thermoplastic that was attached to the lid portion 24 and base portion 25 after manufacturing. Alternatively, the lid portion 24 and base portion 25 may be formed from a single parison, as described above, with a single mold designed to shape the case with the hinge 28. Alternative hinge types and designs are of course utilized on other embodiments, as one of skill in the art will appreciate.

FIG. 4 shows the interior of case 20. Base portion 25 has a cavity 35 for receiving the base insert 10. Lid portion 24 has a cavity 36 for receiving the lid insert 11. The outer rims 37 and 38 of the cavity 35 and the cavity 36, respectively, are dimensioned to securely hold the inserts 10 and 11 in place within the case 20. FIG. 4 shows that the majority of the interior surfaces of the case 20 have been removed through punching, cutting, burning, or the like in order to increase the usable volume of the case. In other embodiments, smaller portions of the internal surfaces may be removed and smaller flexible inserts used. In still other embodiments, none of the internal surfaces are removed from the case 20 such that the case 20 retains a true "double-walled" nature. In these embodiments, the cavities are simply formed in the interior surfaces of the double-wall case.

FIG. 5 shows the case 20 with the lid insert 11 secured in the lid portion 24 and the base insert 10 adjacent to the cavity 35 of base portion 25. Both the base insert 10 and the lid insert 11 may be easily removed from the case 20 for cleaning, drying, or replacement with an alternative insert. As stated above, the material used to create base insert 10 and lid insert 11 is selected to be quick drying and not likely to retain moisture. FIG. 6 is a perspective view of the case 20 with both the lid insert 11 and the base insert 10 secured in their respective portions 24 and 25. Each insert is carefully fit in the cavities 35 and 36 so that neither will unintentionally fall out.

Figure 7:
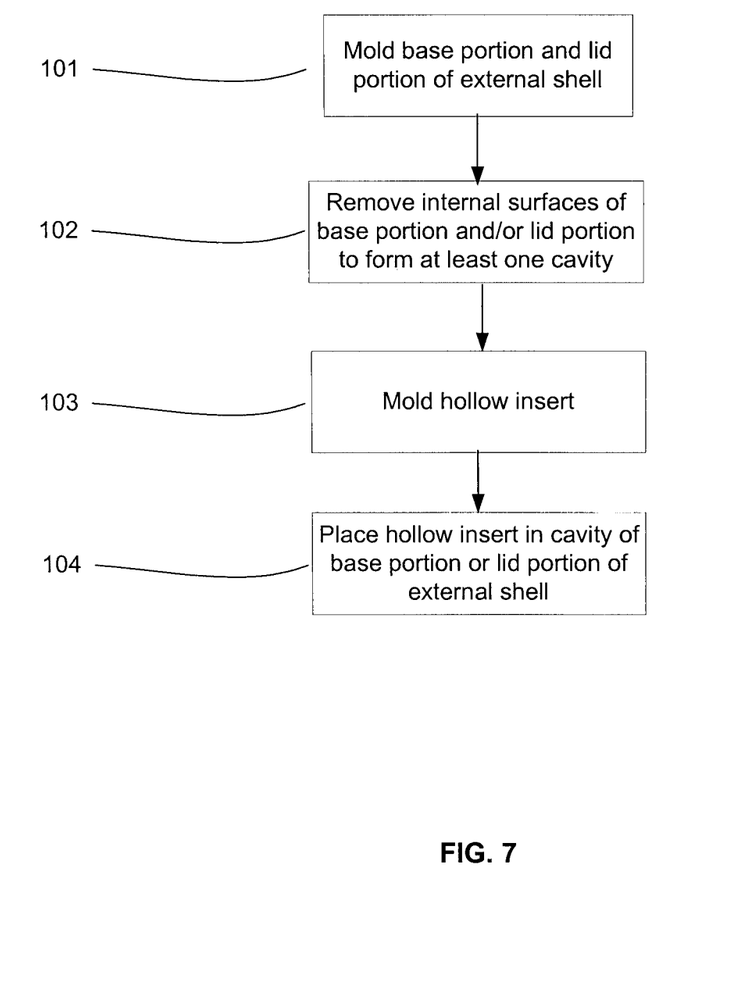
FIG. 7 is a schematic diagram showing a method for producing a protective case according to the present invention.

FIG. 7 shows a method for producing a protective case according to the present invention. The protective case comprises the case 20 and at least one insert 10 as shown in the figures. The case 20 can be thought of as an external shell to the insert. First, at step 101, the external shell comprising a base portion and a lid portion is molded, often using a process of blow-molding. In some embodiments, the external shell, comprising the base portion and lid portion, is molded using a single mold. In other embodiments, the base portion and the lid portion are molded separately using two different molds. When the base and lid portions are molded separately, they must be subsequently joined by a hinge.

Next, at step 102, the internal surfaces of the base portion and/or the lid portion are removed to form one or more cavities in the base and/or lid portions. This increases the volume of the external shell and, consequently, of the case. In some embodiments, the cavities in the external shell are formed, not by removing surfaces from the base and/or lid portions, but simply by the molding at step 101. One or more cavities can be formed by selecting the desired mold shape.

At step 103, the hollow insert is molded, often using a process of blow-molding. The hollow insert is shaped and dimensioned to fit in one of the cavities formed in the base and/or lid portions during steps 101 and/or 102. One of the walls of the hollow insert is provided with at least one recess for holding an object to be stored in the case.

At step 104, the hollow insert is placed in a cavity of the base portion or the lid portion of the external shell. The protective case is then useful for protecting objects. The hollow inserts are easy to clean and dry and, due to their softness and flexibility, provide cushioning to the objects stored therein.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A case for housing at least one object, comprising:
 a base portion comprising a first cavity;
 a lid portion connected by a hinge to the base portion and comprising a second cavity;
 a hollow insert comprising external walls, wherein the hollow insert is shaped to be receivable in one of the first cavity or the second cavity and at least one external wall has at least one recess shaped to receive the at least one object; and
 wherein the external walls of the hollow insert have a lower stiffness than the base portion and the lid portion.

2. The case of claim 1, wherein the base portion and the lid portion are formed by blow-molding.

3. The case of claim 1, wherein the hollow insert is formed by blow-molding.

4. The case of claim 1, wherein the hollow insert is a first hollow insert and the case further comprises a second hollow insert that is receivable in the other of the first cavity or the second cavity.

5. The case of claim 4, wherein the second hollow insert is shaped to press against the object when the object is received in the recess of the first hollow insert.

6. The case of claim 1, wherein the base portion, the lid portion, and the hollow insert comprise thermoplastic materials.

7. The case of claim 1, wherein the recess is shaped to correspond to the outline of the at least one object so that the recess secures the at least one object by friction.

8. The case of claim 1, wherein the interior of the hollow insert formed by the external walls is sealed to the environment external to the hollow insert.

9. The case of claim 8, wherein the pressure inside the hollow insert is greater than 1 atmosphere.

10. The case of claim 1, wherein the interior of the hollow insert formed by the external walls is in fluid communication with the environment external to the hollow insert.

11. An insert receivable within a protective case for holding at least one object, the protective case comprising an external shell and said insert comprising:
- a bottom wall;
- a plurality of side walls; and
- a top wall, having at least one recess shaped to correspond to the outline of the at least one object for receiving the at least one object;
- wherein the bottom wall, side walls, and top wall form a hollow interior of the insert; and
- wherein the bottom wall, side walls, and top wall are less stiff than the external shell of the case within which the insert is disposed so as to provide cushioning to the object.

12. The insert of claim 11, wherein the interior of the insert is sealed to the environment exterior to the insert.

13. The insert of claim 12, wherein the pressure in the interior of the insert is greater than 1 atmosphere.

14. The insert of claim 11, further comprising an opening such that the interior of the insert is in fluid communication with the environment exterior to the insert.

15. The insert of claim 11, wherein the insert comprises a thermoplastic material.

16. A method for producing a case comprising an external shell and an insert for storing at least one object, comprising the steps of:
- molding a base portion and a lid portion of the external shell;
- forming a cavity in one of the base portion or the lid portion of the external shell;
- molding a hollow insert shaped to be receivable in the cavity, comprising a bottom wall, a plurality of side walls, and a top wall which together form a hollow interior of the insert, such that the bottom wall, side walls, and top wall have a lower stiffness than the external shell;
- placing the hollow insert in the cavity.

17. The method of claim 16, wherein the step of molding a base portion and a lid portion of an external shell comprises blow-molding the base portion and the lid portion of the external shell using a single mold.

18. The method of claim 16, wherein the step of forming a cavity in one of the base portion or the lid portion of the external shell comprises removing a section of a surface of one of the base portion or the lid portion.

19. The method of claim 16, wherein the step of molding a hollow insert comprises blow-molding.

20. The method of claim 16, wherein the step of molding a base portion and a lid portion of an external shell comprises:
- blow-molding the base portion using a first mold;
- blow-molding the lid portion using a second mold; and
- joining the base portion and the lid portion by a hinge.

* * * * *